United States Patent
Chin et al.

(10) Patent No.: US 6,769,775 B2
(45) Date of Patent: Aug. 3, 2004

(54) MOTOR OF COLOR WHEEL

(75) Inventors: Ke-Shu Chin, Taipei (TW); Chih-Neng Chang, Taipei (TW); Kuang-Hua Chang, Junghe (TW); Yin-Tai Keng, Taipei (TW); An-Hwa Yu, Shinjuang (TW)

(73) Assignee: Prodisc Technology Inc., Taipei (TW)

( * ) Notice: Subject to any disclaimer, the term of this patent is extended or adjusted under 35 U.S.C. 154(b) by 0 days.

(21) Appl. No.: 10/354,129

(22) Filed: Jan. 30, 2003

(65) Prior Publication Data

US 2004/0032572 A1 Feb. 19, 2004

(30) Foreign Application Priority Data

Aug. 19, 2002 (TW) .................................... 91212870 U

(51) Int. Cl.⁷ .......................... G03B 21/14; G02B 7/00; H04N 9/12
(52) U.S. Cl. .......................... 353/84; 359/892; 348/743
(58) Field of Search .......................... 353/84; 359/889, 359/887, 885, 891, 892; 348/742, 743; 362/322, 324

(56) References Cited

U.S. PATENT DOCUMENTS

| | | | | |
|---|---|---|---|---|
| 4,076,393 A | * | 2/1978 | Bates | 359/892 |
| 6,598,977 B1 | * | 7/2003 | Chen | 353/31 |
| 6,618,214 B2 | * | 9/2003 | Sung et al. | 359/892 |
| 2002/0180938 A1 | * | 12/2002 | Bok | 353/52 |

* cited by examiner

Primary Examiner—Russell Adams
Assistant Examiner—Andrew Sever
(74) Attorney, Agent, or Firm—Birch, Stewart, Kolasch & Birch, LLP

(57) ABSTRACT

A color wheel including a motor body, a housing and a color filter. The housing is set to one side of the central axis of the motor body. The color filter is set on the housing. In this case, at least a groove is formed on one side of the housing adjoining the color filter. In addition, the invention also provides a motor of a color wheel.

6 Claims, 5 Drawing Sheets

MOTOR OF COLOR WHEEL

BACKGROUND OF THE INVENTION

1. Field of the Invention

The invention relates to a color wheel and a motor thereof and, in particular, to a color wheel and a motor of the color wheel, both of which are used in the projection technology.

2. Description of the Related Art

Digital Light Processing (DLP) is a widely used projection technology. DLP has several advantages, including high brightness, accurate tone reproduction, fast response time, noise-free operation, and thin and light composition.

In a DLP projector, a digital control method and a reflection principle are adopted. Light rays from the light source are collected and focused by the lenses to pass through three color filters. Then, the light rays are projected onto a Digital Micro-mirror Device (DMD). Since the DMD includes several movable micro mirrors, driving electrodes may control the tilt angle and deflection time of each movable mirror. Then, the light rays are projected to form an image by switching the direction of the light ray reflections.

In the DLP projector, a color wheel 3 for generating the light rays of several colors is generally provided. Referring to FIG. 1, the color wheel 3 mainly includes a washer 31, a color filter 32 and a motor 33. The washer 31 and the color filter 32 are mounted on the motor 33. In this case, the motor 33 includes a housing 331 and a motor body 332, which rotates together with the housing 331.

In addition, the color wheel is also used in Liquid Crystal on Silicon (LCOS) projectors and Liquid Crystal Display (LCD) projectors. Herein, the function of the color wheel is the same as in DLP projectors for separating the light rays into several colors.

In general, the color filter 32 is mounted on the housing 331 by using an adhesive. When the color filter 32 and the housing 331 are coated with too much adhesive, or the relative position of the color filter 32 and the housing 331 is moved, the adhesive may overflow. In this case, the overflowing adhesive may pollute the color filter 32. Further, the definition and the clear scope of the color filter 32 may decrease.

It is therefore an important objective of the invention to provide a color wheel and a motor thereof to solve the problem mentioned above.

SUMMARY OF THE INVENTION

An objective of the invention is to provide a color wheel and a motor of the color wheel, each of which may have the advantages of avoiding adhesive overflow, providing a clear color filter of the color wheel, and increasing the operational reliability of the color wheel.

To achieve the above-mentioned objective, the invention provides a color wheel including a motor body, a housing and a color filter. The housing is set to one side of the central axis of the motor body. The color filter is set on the housing. In this case, at least one groove is formed on one side of the housing, the side of the housing adjoining the color filter. In addition, the invention also provides a motor of a color wheel.

As mentioned above, the invention provides a color wheel and a motor of the color wheel, in each of which a specific groove is formed. Compared to the prior art, the groove of the motor may absorb an excess of adhesive between the color filter and the housing. In other words, an excess of adhesive may flow into the groove, so that the pollution of the color filter caused by the adhesive is avoided. Furthermore, the definition and the clear scope of the color filter are improved, and the operational reliability of the color wheel is also increased.

BRIEF DESCRIPTION OF THE DRAWINGS

The invention will become more fully understood from the detailed description given in the herein below illustration, and thus are not limitative of the present invention, and wherein.

DETAILED DESCRIPTION OF THE INVENTION

The color wheel and the motor of the color wheel in accordance with preferred embodiments of the invention will be described with reference to the accompanying drawings.

Figure 1:
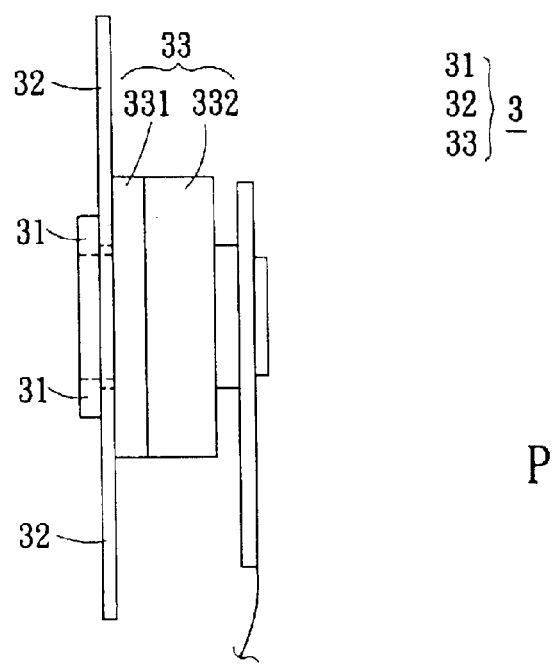
FIG. 1 is a schematic illustration that shows a side view of a conventional color wheel.
Figure 2:
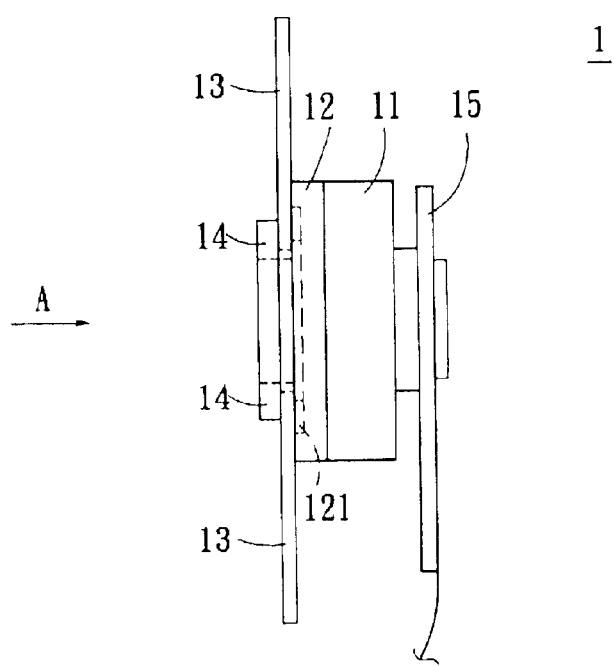
FIG. 2 is a schematic illustration that shows a side view of the color wheel in accordance with an embodiment of the invention.
Figure 3:
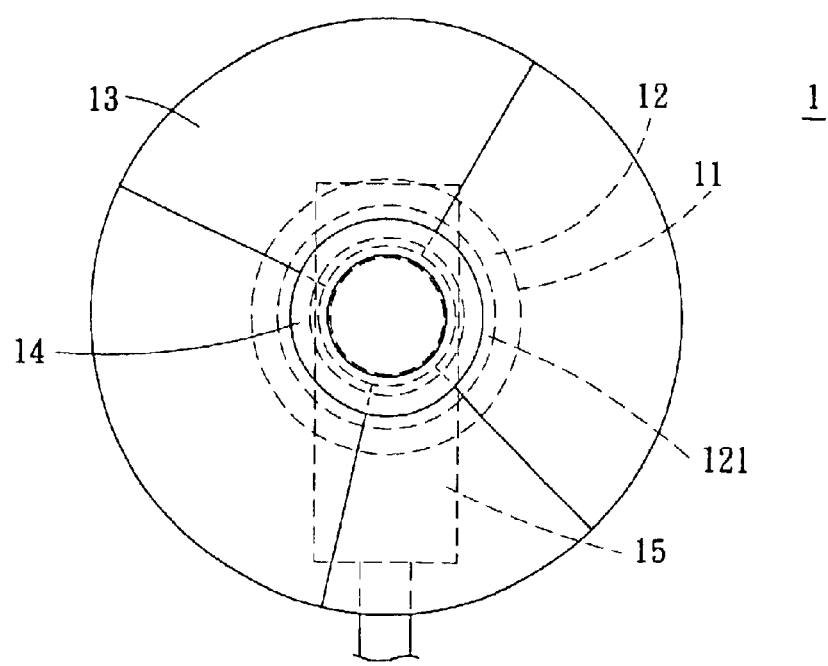
FIG. 3 is a schematic illustration that shows a view of FIG. 2 in the arrowed direction.

Referring to FIG. 2 and FIG. 3, a color wheel 1 provided by an embodiment of the invention includes a motor body 11, a housing 12 and a color filter 13. The housing 12 is set to one side of the central axis of the motor body 11 and rotates together with the motor body 11. The color filter 13 is set on the housing 12 and also rotates together with the motor body 11. In this embodiment, at least a groove 121 is formed on one side of the housing 12, the side of the housing 12 adjoining the color filter 13.

In this embodiment, the motor body 11 mainly includes a shell (not shown), a magnetic ring (not shown), a laminated steel stack (not shown) and a coil (not shown). When the coil is turned on, the laminated steel stack produces a magnetic force and a magnetic field. The positive or negative properties as well as the intensity of the current may cause the magnetic field to vary in an ordered manner. That is, a rotary magnetic field will act in accordance with the magnetic ring, which will rotate accordingly.

Figure 6A:
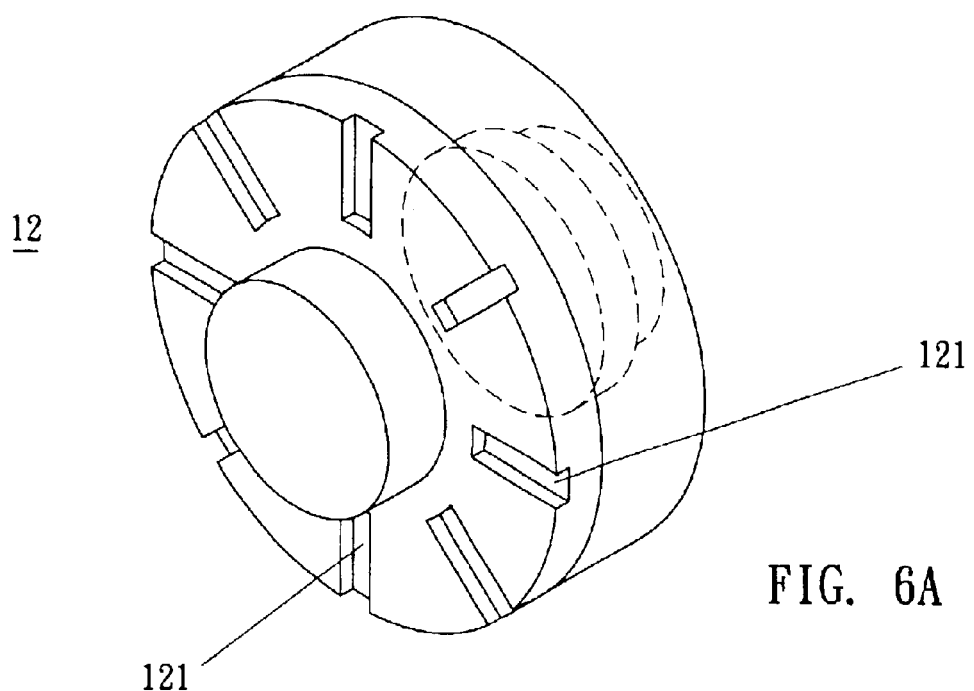
FIG. 6A and FIG. 6B are schematic illustrations that show pictorial view of other two washers in accordance with an embodiment of the invention.
Figure 6B:
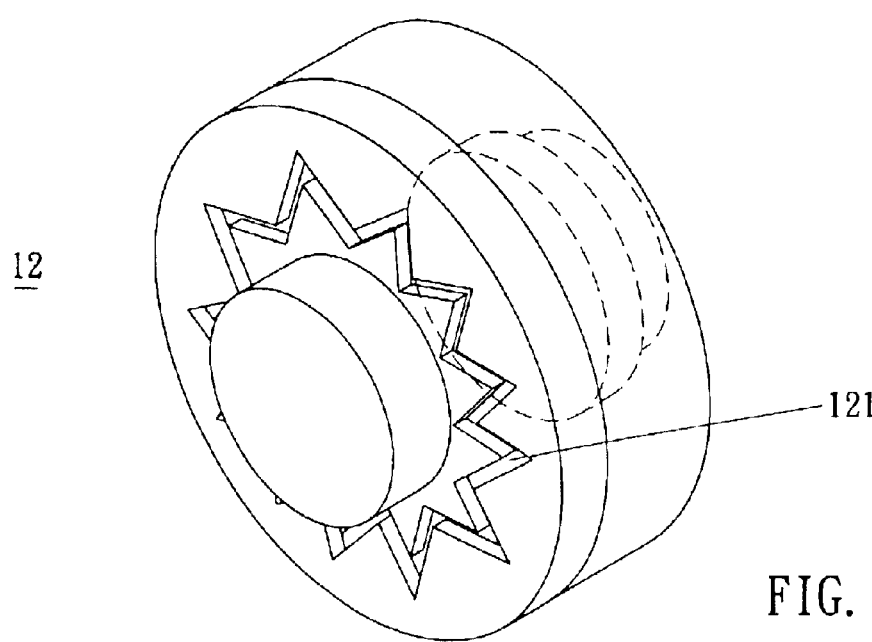

As shown in FIG. 2 and FIG. 3, the housing 12 is set to one side of the central axis of the motor body 11 and rotates together with the motor body 11. The color filter 13 is set on the housing 12 and also rotates together with the motor body 11. In the current embodiment, at least one groove 121 is formed on one side of the housing 12, the side of the housing 12 adjoining the color filter 13. Herein, the groove 121 is a ring-shaped groove, a radial groove (show in FIG. 6A) or an irregular groove (show in FIG. 6B). The number of the grooves is two or more.

As shown in FIGS. 2 and 3, the color filter 13 is set on the housing 12 by way of, for example, a fitting or adhering process. When too much adhesive is applied to the color filter 13 and the housing 12, or the relative position of the color filter 13 and the housing 12 is moved, the adhesive may overflow and pollute the color filter 13. Furthermore, the definition and the clear scope of the color filter 13 may be decreased. In the current embodiment, an excess of adhesive may flow into the groove 121, so that the pollution of the color filter 13 caused by adhesive is avoided.

In this embodiment, the color filter 13 is a circular filter or a ring-shaped filter composed of three or more filter sectors of red, green and blue. The color filter 13 may also be a circular filter or a ring-shaped filter composed of one transparent block and three or more filter sectors of red, green and blue.

Figure 4:
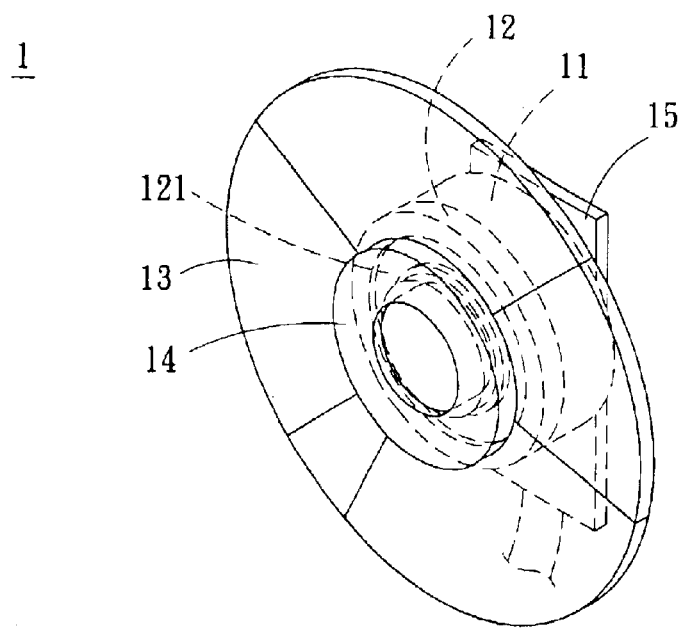
FIG. 4 is a pictorial view of FIG. 2.
Figure 5:
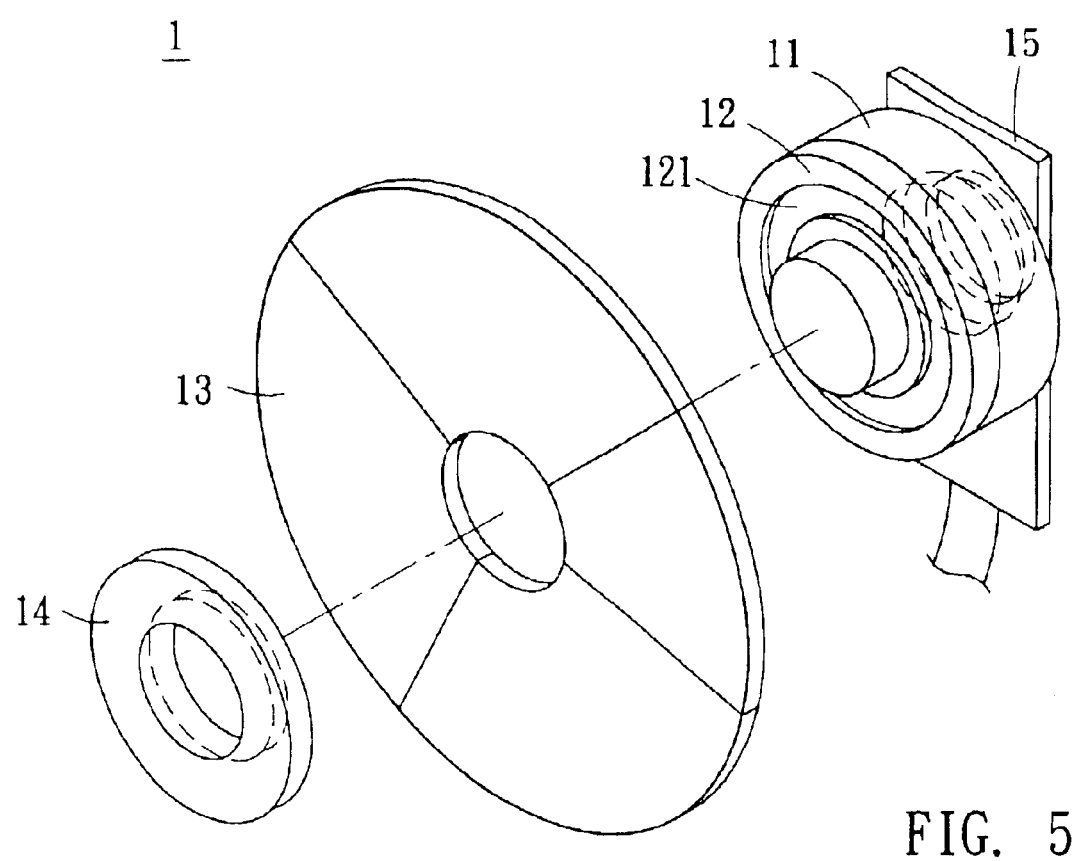
FIG. 5 is a partially pictorial and exploded view of FIG. 4.

FIG. 4 is a pictorial view of FIG. 2, and FIG. 5 is a partially pictorial and exploded view of FIG. 4.

Referring again to FIG. 4 and FIG. 5, the color wheel 1 of this embodiment further includes a washer 14, which is set on the color filter 13 by way of, for example, a fitting or adhering process. In the current embodiment, the washer 14 is used to enlarge the contact area between the color filter 13 and the housing 12.

Referring again to FIG. 4 and FIG. 5, the color wheel 1 of this embodiment further includes a positioning plate 15 on which the motor body 11 is pivotally mounted. The positioning plate 15 is connected to an actuator (not shown) via wires (not shown). The actuator drives the motor body 11 to rotate about a central axis corresponding to the pivotal point between the positioning plate 15 and the motor body 11.

Figure 7:
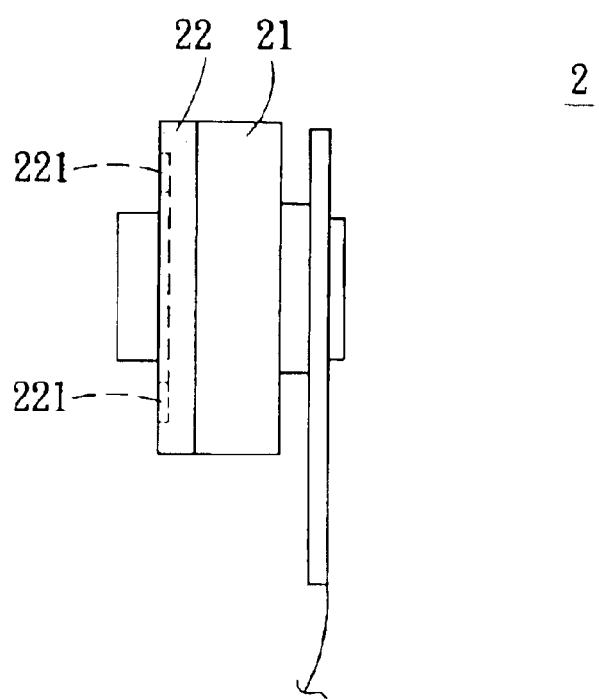
FIG. 7 is a schematic illustration that shows a side view of a motor of the color wheel in accordance with another embodiment of the invention.

In addition, another embodiment of the invention provides a motor 2 for a color wheel. The motor 2 includes a motor body 21 and a housing 22, which rotates together with the motor body 21. The housing 22 is set to one side of the central axis of the motor body 21. In this case, at least a groove 221 is formed on one side of the housing 22, the side of the housing 22 being opposite to the motor body 21 as shown in FIG. 7.

Since the elements in this embodiment have the same features and functions as those of the corresponding elements in the color wheel 1, detailed description thereof will be omitted.

In this invention, a specific groove is formed on the motor of the color wheel. Compared to the prior art, the groove of the motor may absorb an excess of adhesive between the color filter and the housing. In other words, an excess of adhesive may flow into the groove, so that the pollution of the color filter caused by the adhesive is avoided. Furthermore, the definition and the clear scope of the color filter are proved, and the operational reliability of the color wheel is also increased.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A motor of a color wheel, comprising:

a motor body; and a housing set at a side of a central axis of the motor body, wherein at least a groove is formed on a side of the housing, the side of the housing being opposite to the motor body.

2. The motor according to claim 1, wherein the groove of the housing is a ring-shaped groove.

3. The motor according to claim 1, wherein the groove of the housing is a radial groove.

4. The motor according to claim 1, wherein the groove of the housing is an irregular groove.

5. The motor according to claim 1, wherein the housing has two or more grooves.

6. The motor according to claim 1, further comprising a positioning plate on which the motor body is pivotally mounted.

* * * * *